Fig. 1.

May 10, 1927.  
G. P. MALLORY.  
1,628,257  
APPARATUS FOR FORMING ARTICLES FROM PAPER OR SIMILAR MATERIAL  
Filed May 26, 1923  
4 Sheets-Sheet 2

Inventor:
George P. Mallory
by Macleod, Calvn, Copeland & Dike
Attorneys

May 10, 1927.

G. P. MALLORY 1,628,257

APPARATUS FOR FORMING ARTICLES FROM PAPER OR SIMILAR MATERIAL

Filed May 26, 1923 4 Sheets-Sheet 3

Patented May 10, 1927.

1,628,257

UNITED STATES PATENT OFFICE.

GEORGE P. MALLORY, OF PHILADELPHIA, PENNSYLVANIA, ASSIGNOR TO SANITARY PRODUCTS CORPORATION OF AMERICA, OF PHILADELPHIA, PENNSYLVANIA, A CORPORATION OF VIRGINIA.

APPARATUS FOR FORMING ARTICLES FROM PAPER OR SIMILAR MATERIAL.

Application filed May 26, 1923. Serial No. 641,591.

This invention relates to the molding of articles from fibrous, plastic, or semi-plastic material and especially, although not exclusively, to the manufacture of table utensils, such as spoons and forks from paper or similar sheet material.

In the manufacture of articles of this kind from such stock, it has heretofore been necessary to temper the stock by wetting the same in such a manner as to saturate it with moisture to a sufficient extent to permit the molding of the articles between the usual shaping dies. This necessity has heretofore been the cause of considerable inconvenience and expense, and has resulted in an uneven and otherwise unsatisfactory product. In order to secure the best results, the stock should be evenly moistened throughout to a certain degree only, and it has been found difficult, due to variations in atmospheric conditions, thus evenly to temper the stock at all times. Moreover, the articles thus formed must be dried before being packed for shipment, and considerable time, depending also upon atmospheric conditions, is necessary for this purpose, it having been found impracticable and unsatisfactory to employ artificial drying means. Two days or more are frequently required for this purpose, so that, in plants in which such operations are carried out, it is necessary to provide storage space for at least the quantity produced in two days, thereby seriously handicapping the rate of production in a plant of given size. Also, the articles so formed are not available for shipment until after the expiration of the time required for drying.

Furthermore, such articles are usually formed in a press having cooperating combined blanking-out and shaping dies from between which the articles must be removed, usually by a blast of air, causing them to be discharged in a heterogeneous manner and requiring special provision for their reception and additional labor in packing.

The present invention has for an object the elimination of the necessity of tempering the stock by moisture, thereby resulting in a more even product irrespective of the atmospheric conditions, which product is immediately available, doing away with the necessity for storage space for drying purposes, and permitting a quicker turn-over in the operation of the plant. The invention also has for its object the delivery of the articles in an orderly manner, so as to permit of their reception in the containers in which they are to be shipped. To these ends, the invention contemplates the molding of the articles from dry stock in the presence of dry heat, which is found to soften the stock to a sufficient extent to permit the molding thereof, said stock retaining the form into which it has been molded upon cooling, and the heat employed (approximately 160° F.) being insufficient to injure the stock or prevent the immediate availability of the product. This operation is preferably carried on by means of an apparatus comprising blanking-out dies for separating blanks from the stock, shaping dies to receive the blanks and mold them into the desired form under pressure and in the presence of dry heat applied to the dies, the finished articles being subsequently ejected from the forming dies at a definite point and in such a manner as to permit their reception in nested form in a suitable container.

The foregoing and other objects of the invention, together with means whereby the same may be carried into effect, will best be understood from the following description of the construction and operation of an apparatus by means of which it may be practiced. It will be understood, however, that the particular construction and arrangement of the apparatus shown, and the particular operations described, have been chosen for illustrative purposes merely, and that the invention, as defined by the claims hereunto appended, may be otherwise practiced without departure from its spirit and scope.

Figure 1:
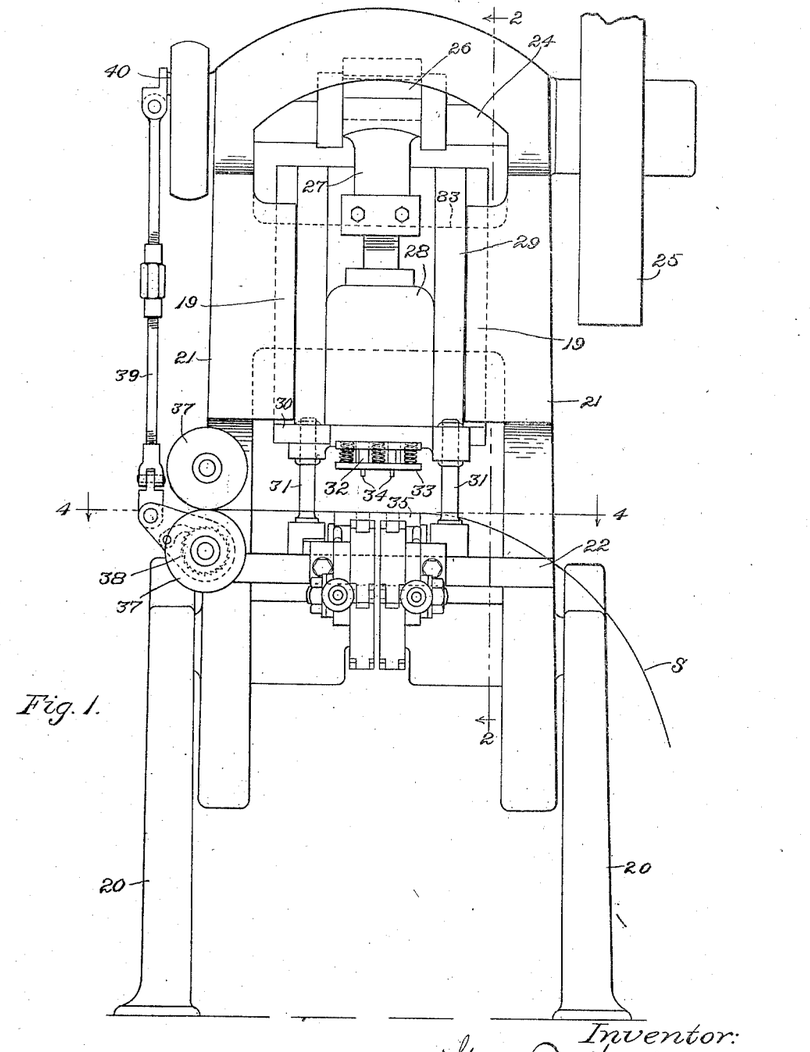
Fig. 1 is a front elevation of a machine constructed and operating in accordance with the invention.
Figure 2:
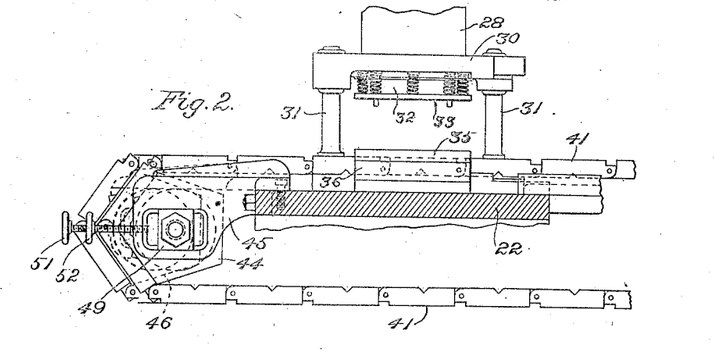
Figs. 2 and 3 are vertical sections, taken substantially on the line 2—2 of Figure 1, of the front and rear portions respectively of the machine, the blanking-out dies being shown in both views, and the same being shown raised in Figure 2 and depressed in Figure 3.
Figures 3, 10, 11:
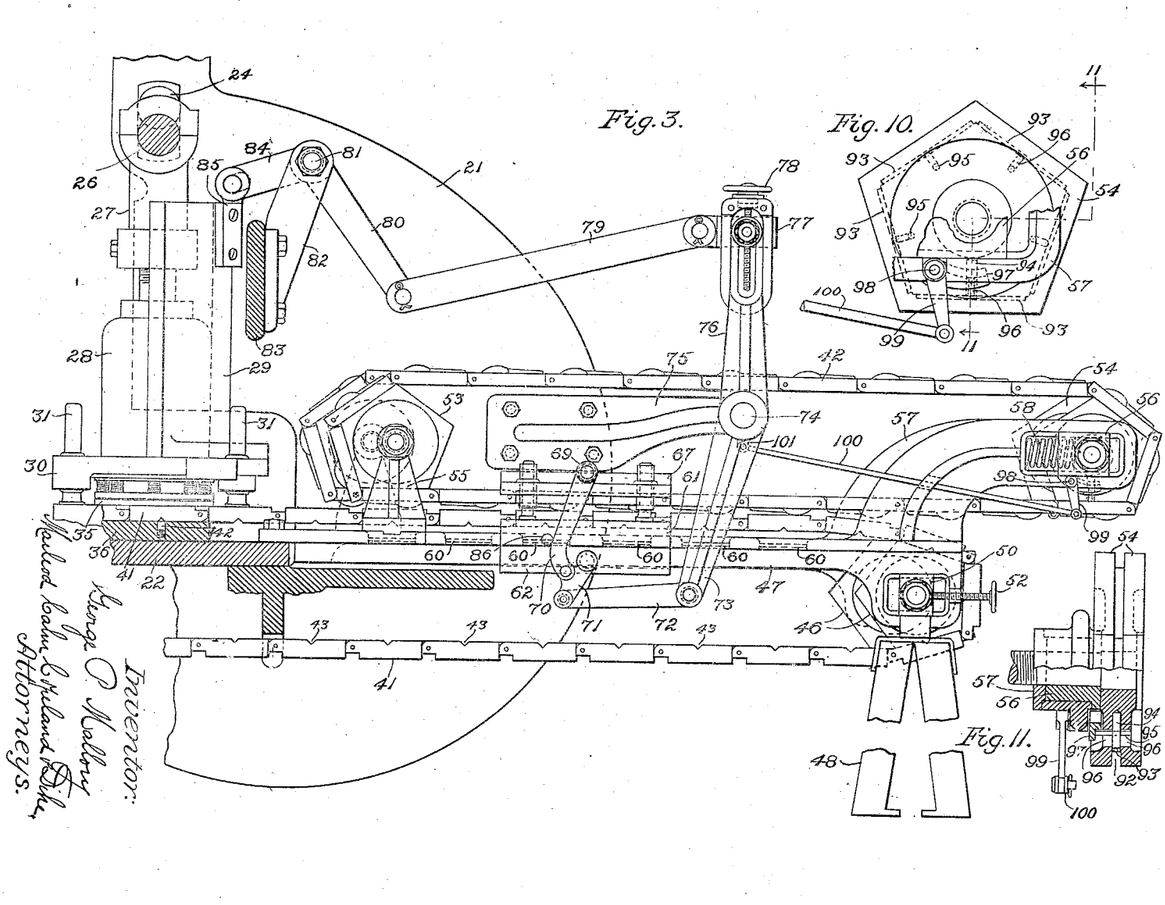
Fig. 10 is an enlarged elevation, partly broken away, of the drums for supporting one end of the upper set of shaping die sections and the ejector or knock-out devices carried thereby.
Fig. 11 is an end elevation, partly in section on the line 11 of Figure 10, of the parts shown in the latter figure.
Figure 4:
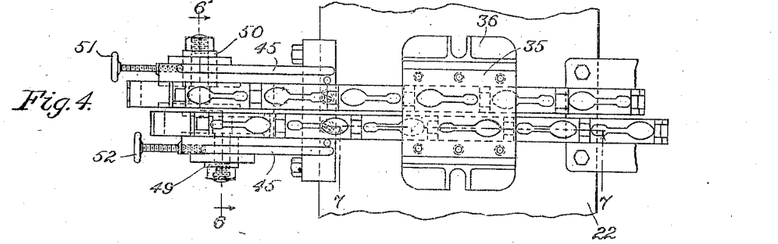
Figs. 4 and 5 are horizontal sections (corresponding to Figures 2 and 3), taken substantially on the line 4—4 of Figure 1, of the front and rear portions respectively of the machine, the stock feeding rollers and the guides for the upper blanking-out die being omitted, and the molding and shaping mechanism substantially as a whole being shown in plan.

The press which constitutes the blanking-out portion of the apparatus may be of any suitable design, but as herein shown is substantially of the type illustrated in Letters Patent No. 1,378,707, dated May 17, 1921. Said press is supported upon a suitable base 20 (Fig. 1) and comprises uprights 21 carrying between them a bolster 22 and in the upper part of which is journalled a driving shaft 24 to which power from any suitable source may be supplied through a belt pulley 25. The shaft 24 is formed with a crank 26 connected by a preferably adjustable pitman 27 with a ram 28 having secured thereto a semicylindrical web plate 29 by which said ram is guided for vertical movement in guides 19 on the uprights 21. Secured to the lower end of the ram is a punch carrier 30 guided by posts 31 rising from the bolster 22, and secured to the punch carrier 30 is a punch 32 provided with the usual spring pressed stripper plate 33 and yieldingly mounted knockout pins 34 (see also Fig. 7), said punch cooperating with an open punch die 35 forming part of an open-ended, box-like member 36 carried by the bolster 22 above which said punch die is supported in elevated position. The punch 32 and punch die 35 constitute blanking-out dies which are preferably double, so as to blank out two articles at each stroke of the ram, as explained in Letters Patent No. 1,378,707, above referred to. Said dies are, however, constructed to punch blanks from the stock only, and not to mold said blanks, as in said prior patent. The strip of paper or similar stock S is intermittently fed between the blanking-out dies by means of feed rollers 37 operated by a ratchet mechanism 38 connected by a pitman 39 with a crank 40 on the shaft 24.

The blanks B (see particularly Fig. 7) which are severed from the stock S by the punch 32 are forced by said punch through the open punch die 35 and are received successively in lower die sections 41 which, with complementary die sections 42 (Figs. 3, 5, 8 and 9), constitute the forming dies. The die sections 41 comprise links which are pivotally connected to form a continuous endless chain, there being two chains of die sections 41 and two cooperating chains of die sections 42, the die sections 41 of the two lower chains being slightly staggered with respect to one another to correspond with the staggered relationship of the openings in the punch die 35, and the die sections 42 of the upper chains being similarly arranged. The die sections 41 are guided in the box-like member 36, each of the said die sections, as it is brought beneath the corresponding opening in the punch die 35, being centered with respect to said opening by a spring pressed plunger 142 carried by said member 36 and having a tapered end to engage bevelled recesses 43 in the several die sections.

The chains formed by the die sections 41 pass about drums 44 carried by brackets 45 secured to the bolster 22 at the front of the machine and at the rear of the machine about drums 46 carried by a beam 47 which is secured at its forward end to the bolster 22 and is supported at its rear end by a suitable upright 48. The drums 44 and 46 are of polygonal form, having flattened sides to engage the links or die sections, and are journalled in bearings 49 and 50, respectively, which bearings are adjustable, to take up the slack in the chains and properly position the several die sections, by means of adjusting screws 51 and 52. The chains formed by the die sections 42 pass about similar polygonal drums 53 and 54 so located as to support and guide each of said chains with its lower reach adjacent and parallel to the upper reach of the corresponding chain of die sections 41. The drums 53 are journalled in fixed bearings carried by brackets 55 secured to the top of the beam 47 adjacent the forward end thereof, while the drums 54 are journalled in bearings 56 which are slidably mounted in arms 57 extending upwardly and rearwardly from the rear end of the beam 47, said bearings 56 being normally pressed rearwardly, to take up the slack in the chains, by springs 58.

The beam 47 is formed with a longitudinal series of openings 59 in which are located electric heating units 60 (Figs. 3, 8 and 9) of any suitable type. The construction and connections of the heating units 60 are not shown in detail herein, as these parts may be of any suitable standard type. The arrangement is such that the heaters 60 are located immediately beneath portions of the upper reaches of the chains formed by the die sectons 41, so as to heat said die sections as they pass over the beam 47 in the operation of the machine.

Guided for longitudinal reciprocation on the beam 47 is a slide comprising upper and lower members 61 and 62 held in assembled position upon said beam by means of bolts 63. The upper member 61 is shaped on its upper surface to support and guide the several die sections 41 as they pass thereover and carries a friction device comprising pads 64 of friction material which are forced by set screws 65, acting through follower plates 66, against the upper surface of the beam 47, whereby longitudinal movement of said slide is yieldingly resisted to an extent determined by the adjustment of the set screws. The upper member 61 of the slide constitutes also the lower member of a clamp, the upper member of which comprises a plate 67 guided for movement toward and from the member 61 on posts 68 rising from the latter member. The clamp plate 67 is shaped on its under surface to receive and guide the several die sections 42. Rotatably supported at the top of the plate 67 is a shaft 69 having secured to its opposite ends depending arms 70. The arms 70 are pivoted at their lower ends to levers 71 intermediate the ends of the latter, said levers being pivoted at their upper ends to the lower member 62 of the slide. At their lower ends, the levers 71 are connected by links 72 with arms 73 (Fig. 3) on a shaft 74 journalled in brackets 75 (see also Fig. 5) secured to the side members 21 of the frame of the press. The shaft 74 has fast thereon additional arms 76 carrying at their upper ends a block 77 which is adjustable longitudinally of said arms by means of an adjusting screw 78. The block 77 is connected by links 79 with arms 80 on a shaft 81 journalled in brackets 82 supported by a cross member 83 of the press frame. Secured to the shaft 81 is a third arm 84 which is pivotally connected with a bracket 85 secured to the web plate 29 of the ram 28.

Figures 8, 9:
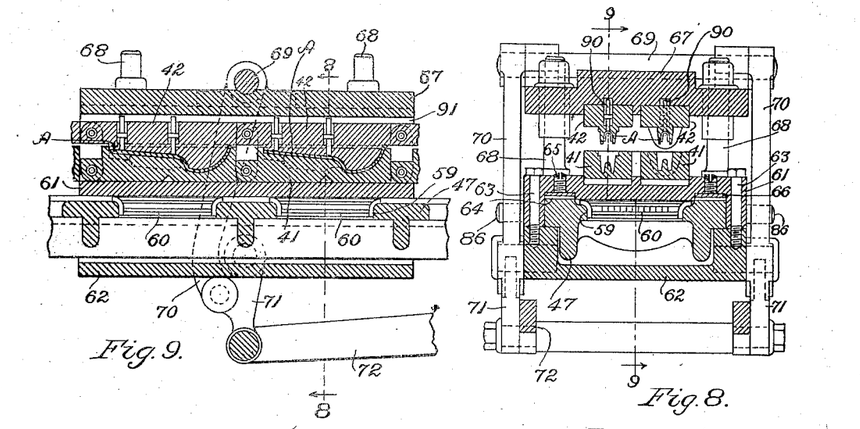
Fig. 8 is an enlarged section, taken substantially on the line 8—8 of Figure 9, showing the cooperating shaping die sections separated after molding the blanks into the desired form.
Fig. 9 is a section, taken substantially on the line 9—9 of Figure 8, showing the shaping die sections pressed together in the molding of the articles.

It will be seen that when the ram 28 is reciprocated the arms 73 will, through the connections above described, be oscillated about the axis of the shaft 74. As the arms 73 move toward the right from the position shown in Figure 3, the links 72 will tend to draw the slide 61. 62 also toward the right. This movement is, however, resisted by the friction devices 64, so that the levers 71 are swung about their pivots, drawing downwardly upon the links 70, and drawing the upper member 67 of the clamp downwardly upon the lower member 61, as shown in Figure 9. This closing of the clamp causes the shaping die sections 42 to be pressed against the complementary sections 41, thereby shaping the blanks B into articles A. When the clamp has been closed with sufficient pressure to overcome the force of the friction (which may be determined by adjustment of the friction device by the set screws 65) the closing movement of the clamp will be arrested and the slide moved toward the right, carrying with it the adjacent reaches of the two chains and moving the dies rearwardly. As the arms 73 move in the opposite direction, the clamp will first be opened (being again held against longitudinal movement by the friction devices) to separate the die sections, and then, the arms 70 being brought into engagement with pins 86 projecting from the member 61, the whole clamping device is moved forwardly to engage the chains at a new point. The longitudinal movement of the clamp at each reciprocation of the ram is equal to the length of one die, said clamp, however, being preferably of a sufficient length to engage two dies at one time. The closing of the die sections by the clamp is permitted by the springs 58, which enable the drums 54 to yield somewhat, said springs subsequently expanding and by such action operating to separate the die sections when the clamp is opened.

Each of the die sections 42 is provided with a pair of sliding knock-out pins 90 the outer ends of which are received in a groove 91 in the clamping plate 67 and in a groove 92 in the corresponding drum 54, similar grooves being provided in the drums 53. Located in the groove 92 of each of the drums 54 are knock-out plates 93 having stems 94 arranged to slide radially in the drum. Each of the stems 94 is provided with a transverse pin 95 which projects through slots 96 in the body of the drum. The pins 95 of each drum are, as the drum is rotated, brought successively into a position for engagement by an arm 97 on a shaft 98 journalled in an adjacent portion of the arm 57. At the outer end of the shaft 98 is an arm 99 connected by a link 100 with a lug 101 on the shaft 74. As the arm 97 is oscillated by the connections last described, it engages the pin 95 on the stem 94 of the adjacent knock-out plate 93, moving said plate outwardly, and causing the same, by engagement with the outer ends of the knockout pins 90 of the die section 42 then in engagement therewith, to move said pins outwardly to eject the finished article adhering to said die.

The complete operation of the machine is as follows:—

Figures 5, 6, 7:
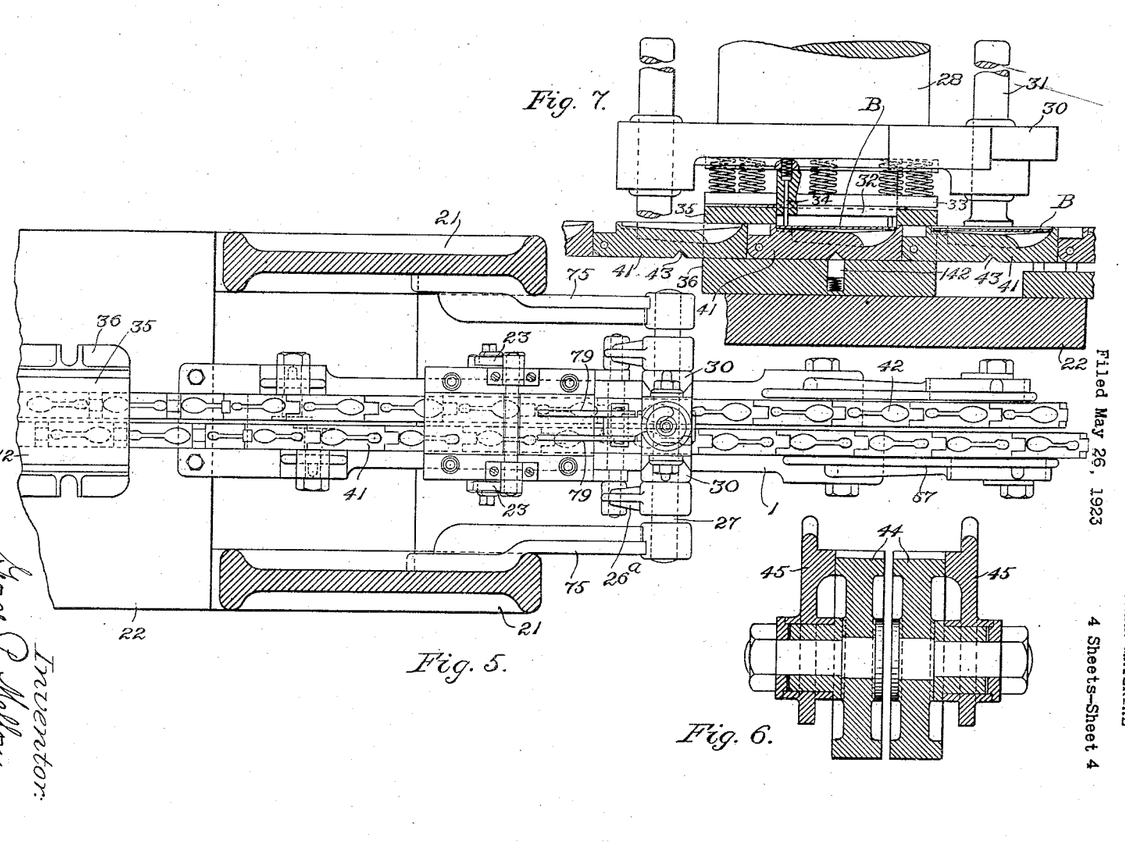
Fig. 6 is an enlarged detail section, taken substantially on the lines 6—6 of Figure 4, of the drums for supporting one end of the set of lower shaping die sections.
Fig. 7 is an enlarged sectional view, taken substantially on the line 7—7 of Figure 4, illustrating the cooperation of the blanking-out and shaping dies.

As the ram 28 is reciprocated it will at each downward movement, punch two blanks from the dry or untempered stock S, forcing said blanks through the open punch die 35 and into the die section 41 immediately below the latter, as shown in Figure 7. During the downward movement of the ram, the chains of die sections 41 and 42 remain stationary, as do also the feed rollers 37, said feed rollers being operated at each upward movement of the ram to advance the stock. Also during the upward movement of the ram, the clamp 61, 67 is closed to press two adjacent die sections 42 into engagement with the complementary die sections 41 with a force determined by the adjustment of the set screws 65, after which the slide 61, 62 is advanced to feed the chains an amount substantially equal to the length of one pair of die sections. The die sections are thus intermittently advanced, so that the sections which have received blanks from the blanking-out dies are successively brought into the clamp, being in the meantime heated by the heaters 60 to a sufficient extent to soften the stock. This dry heat is maintained by additional heaters immediately under the clamp and beyond the same. As the clamp is closed, the complementary die sections are pressed together and shape or mold the blank, as shown in Figure 9, the pressure being repeated upon the next closure of the clamp after the chains have been moved. As the die sections are separated, as shown in Figure 8, the completed articles will, by reason of the shape of the dies, adhere to the upper dies 42 and, as the movement of the chains of said upper dies continues, will eventually be brought to the drums 54. At this point the corresponding ejector plates 93 are operated to cause the knock-out pins 90 to release the blanks from the dies. It will be seen that in this manner two finished articles are ejected from the machine at each operation, the articles from each chain being all discharged at exactly the same point and in the same position, so that said articles can readily be received in nested condition in a suitable container of relatively small size.

While the invention has been herein described in connection with the manufacture of spoons from paper stock, it will be obvious that many features of the apparatus shown, and defined by the following claims, are not dependent for their utility upon the precise material operated upon, and that said apparatus may, with such modifications as clearly fall within the spirit of the invention and the range of mechanical skill, be employed for the manufacture of a wide variety of articles from substantially any material capable of being molded under the influence of dry heat in the manner explained.

Having thus described my invention, I claim:—

1. An apparatus for forming articles from sheet material comprising, in combination, dies for punching blanks from said material, and shaping dies movable into and out of position to receive said blanks from said punching dies.

2. An apparatus for forming articles from sheet material comprising, in combination, a punch, a cooperating open punch die, and means for shaping blanks punched from the material by said punch, said means including a shaping die, means for supporting said shaping die in a position adjacent said punch die to receive the blanks therefrom, and means for moving said shaping die into and out of said position.

3. An apparatus for forming articles from sheet material comprising, in combination, dies for punching blanks from said material, a shaping die comprising complementary die sections, and means for moving one of said die sections alternatively into position to receive said blanks from said punching dies and into cooperation with its complementary die section to mold said blanks.

4. An apparatus for forming articles from sheet material comprising, in combination, a punch, a cooperating open punch die, a shaping die comprising complementary sections, and means for moving one of said sections alternatively into position adjacent said punch die to receive therefrom the blanks removed from the material by said punch, and into cooperation with its complementary section to mold said blanks.

5. An apparatus for forming articles from sheet material comprising in combination, dies for punching blanks from said material, shaping dies adapted to receive said blanks from said punching dies, means cooperating with said shaping dies to form articles from said blanks, and means for successively moving said shaping dies from said punching dies to said cooperating forming means.

6. An apparatus for forming articles from sheet material comprising, in combination, dies for punching blanks from said material, and a series of shaping dies for molding said blanks into the desired form, each of said shaping dies comprising a plurality of complementary sections, and the corresponding sections of the several dies being linked together in continuous chains.

7. An apparatus for forming articles from sheet material comprising, in combination, a pair of dies for punching blanks from said material, and means for shaping said blanks including a travelling series of shaping dies respectively adapted to mold successive blanks into the desired form.

8. An apparatus for forming articles from sheet material comprising, in combination, a pair of dies for punching blanks from said material, a series of travelling dies, and means cooperating with said dies to shape said blanks, successive dies of said series operating upon successive blanks, and each of said dies being adapted, with said cooperating means, to mold a blank into the desired form.

9. An apparatus for forming articles from sheet material comprising, in combination, a pair of dies for punching blanks from said material, and a plurality of shaping dies respectively adapted to mold successive blanks into the desired form, each of said shaping dies comprising a plurality of complementary sections, and the corresponding sections of the several dies being linked together in continuous chains.

10. An apparatus for forming articles from sheet material comprising, in combination, dies for punching blanks from said material, a series of shaping die sections movable successively into a position to receive said blanks from said punching dies, and a corresponding series of complementary die sections into cooperation with which said first named die sections are movable to mold said blanks.

11. An apparatus for forming articles from sheet material comprising, in combination, a punch, a cooperating open punch die, a series of shaping die sections movable successively into a position adjacent said punch die to receive therefrom the blanks removed from the material, and a corresponding series of complementary die sections into cooperation with which said first named die sections are movable to mold said blanks.

12. An apparatus for forming articles from sheet material comprising, in combination, dies for punching blanks from said material, a series of shaping dies for molding said blanks, each of said shaping dies comprising a plurality of complementary sections, and the corresponding sections of the several dies being linked together into continuous chains, and devices for supporting and operating said chains adapted to bring the die sections of one of said chains successively into a position to receive said blanks from said punching dies and to bring the several die sections of each die into cooperation.

13. An apparatus for forming articles from sheet material comprising, in combination, a punch, a cooperating open punch die, a series of shaping dies each comprising a plurality of complementary sections, the corresponding sections of the several dies being linked together into continuous chains, and devices for supporting and operating said chains adapted to bring the die sections of one of said chains successively into a position adjacent said punch die to receive therefrom the blanks removed from the material and to close the several sections of each die upon said blanks to mold the same.

14. The combination of two sets of travelling die sections, the sections of one set being complementary to the sections of the other set, mechanism for delivering a blank to a section of one set, and means actuated in response to the movement of the mechanism for moving other sections of the two sets into cooperation to shape a different blank.

15. An apparatus for forming articles from sheet material comprising, in combination, dies for punching blanks from said material, shaping dies for molding said blanks, means for moving said shaping dies while holding them closed upon the blanks, and means for heating said shaping dies.

16. An apparatus for forming articles from sheet material comprising, in combination, dies for punching blanks from said material, a series of shaping dies for molding said blanks, each of said shaping dies comprising a plurality of complementary sections, and the corresponding sections of the several dies being linked together in continuous chains, and means for heating the die sections of one of said chains.

17. In an apparatus of the character described, a series of shaping dies each comprising complementary sections, devices for closing the sections of the several dies successively and for moving the series longitudinally, and stationary means for heating said dies as they are moved.

18. In an apparatus of the character described, a series of shaping dies each comprising complementary sections, and means operative upon the several dies for successively pressing together the sections thereof and thereafter feeding the series intermittently.

19. An apparatus for forming articles from sheet material comprising, in combination, dies for punching blanks from said material, a series of shaping dies for molding said blanks, said shaping dies each comprising complementary sections, and means for successively pressing together the sections of the several dies and feeding the series intermittently.

20. In an apparatus of the character described, a series of shaping dies each comprising complementary sections, means for successively pressing together the sections of the several dies and feeding the series intermittently, and stationary means for heating said dies.

21. In an apparatus of the character described, a series of shaping dies each comprising complementary sections, the corresponding sections of the several dies being linked together in continuous chains, and the several chains having adjacent reaches disposed normally parallel and in spaced relation, and means for pressing together a portion of said reaches to engage certain die sections while a portion of said reaches remain in spaced relation.

22. In an apparatus of the character described, a series of shaping dies each comprising complementary sections, the corresponding sections of the several dies being linked together in continuous chains, and the several chains having reaches disposed adjacent and parallel to one another, a clamp for successively engaging the complementary die sections of the several chains and pressing them together, and means for reciprocating said clamp to feed said chains.

23. An apparatus for forming articles from sheet material comprising, in combination, dies for punching blanks from said material, a series of shaping dies for molding said blanks, each of said shaping dies comprising complementary sections, the corresponding sections of the several dies being linked together in continuous chains, and the several chains having reaches disposed adjacent and parallel to one another, and means for successively pressing together the complementary die sections of the several chains and intermittently feeding said chains.

24. In an apparatus of the character described, a series of shaping dies each comprising complementary sections, the corresponding sections of the several dies being linked together in continuous chains, means for supporting and guiding said chains with adjacent reaches of the several chains normally parallel and in spaced relation and means for successively pressing together certain complementary sections relatively to adjacent complementary sections of said reaches.

25. In an apparatus of the character described, a series of shaping dies each comprising complementary sections, the corresponding sections of the several dies being linked together in continuous chains, means for supporting and guiding said chains with reaches of the several chains adjacent and parallel to one another, and independent means for successively pressing together the complementary die sections of the several chains and feeding said chains.

26. In an apparatus of the character described, a plurality of shaping dies each comprising complementary sections, a beam adjacent which the corresponding sections of the several dies are guided in a series, means for guiding the complementary sections in another series adjacent thereto, a clamp for successively engaging complementary die sections in the respective series and pressing them together, means for closing said clamp and moving the same longitudinally along said beam, and a friction device between said clamp and beam for holding said clamp against longitudinal movement until closed with sufficient force to overcome the friction.

27. In an apparatus of the character described, a series of shaping dies each comprising complementary sections, the corresponding sections of the several dies being linked together in continuous chains, and the several chains having reaches disposed adjacent and parallel to one another, a beam disposed adjacent and parallel to said reaches, a clamp guided on said beam and engaging at opposite sides adjacent portions of the several chains, means for closing said clamp and moving the same longitudinally along said beam, and a friction device between said clamp and beam for holding said clamp against longitudinal movement until closed with sufficient force to overcome the friction.

28. In an apparatus of the character described, a plurality of shaping dies each comprising complementary sections, a beam adjacent which the corresponding sections of the several dies are guided in a series, means for guiding the complementary sections in another series adjacent thereto, a clamp for successively engaging complementary die sections in the respective series and pressing them together, means for closing said clamp and moving the same longitudinally along said beam, and a friction device between said clamp and beam for holding said clamp against longitudinal movement until closed with sufficient force to overcome the friction, said friction device being adjustable to vary the closing pressure of said clamp.

29. In an apparatus of the character described, the combination with a press having cooperating blanking out dies and a ram by which one of said dies is carried, of a series of shaping dies each comprising complementary sections, and mechanism operated by said ram for successively pressing together the sections of the several dies.

30. In an apparatus of the character described, the combination with a press having cooperating blanking out dies and a ram by which one of said dies is carried, of a series of shaping dies each comprising complementary sections, and mechanism operated by said ram for successively pressing together the sections of the several dies and feeding the series.

31. In an apparatus of the character described, the combination with a press having cooperating blanking out dies and a ram by which one of said dies is carried, of a plurality of shaping dies each comprising complementary sections, a beam adjacent which the corresponding sections of the several dies are guided in a series, means for guiding the complementary sections in another series adjacent thereto, a clamp guided for longitudinal movement on said beam for successively engaging complementary die sections of the respective series and pressing them together, means carried by said clamp for closing the same, a member movable longitudinally of said beam for operating said closing means and moving said clamp on said beam, means for operatively connecting said last named member with said ram, and a friction device between said clamp and beam for holding said clamp against movement on said beam by said longitudinally movable member until the latter has caused said closing means to close said clamp with sufficient force to overcome the friction.

32. An apparatus for forming articles from sheet material comprising, in combination, dies for punching blanks from the material, shaping dies adapted to receive said blanks from said punching dies, and mechanism for operating said shaping dies to convey said blanks away from said punching dies and to press and mold the same.

33. An apparatus for forming articles from sheet material comprising, in combination, dies for punching blanks from the material, shaping dies adapted to receive said blanks from said punching dies, mechanism for operating said shaping dies to press and mold said blanks and to convey the same away from said punching dies, and means for ejecting the molded blanks from said shaping dies.

34. In an apparatus of the character described, a series of shaping dies each comprising complementary sections, means for successively pressing together the sections of the several dies and feeding the series intermittently, and means for ejecting the molded blanks from said dies.

35. In an apparatus of the character described, a series of shaping dies each comprising complementary sections, the corresponding sections of the several dies being linked together in continuous chains, drums for supporting and guiding said chains with reaches of the several chains adjacent and parallel to one another, mechanism for successively pressing together the complementary die sections of the several chains and for feeding said chains, and ejector mechanism carried by one of said drums and cooperating successively with the several die sections of the corresponding chain as they pass thereabout.

36. The combination of a pair of cooperating spaced forming members, and means movable in two directions for moving said members into engagement to form an article and also for moving said members together with the article.

37. The combination of a series of die members linked to form an endless chain, supports at the ends thereof for supporting the chain, a cooperating die section, means for moving a die member toward said die section, and means for permitting yielding movement of one of said supports during the movement of said die member.

38. The combination of two sets of travelling complementary die sections one set travelling beyond the other, means for operating the complementary die sections to form an article, and means controlled by said operating means for discharging the article from one of the sections upon travelling a predetermined distance beyond its complementary section.

In testimony whereof I affix my signature.

GEORGE P. MALLORY.